US007122145B2

(12) United States Patent
Olaru et al.

(10) Patent No.: US 7,122,145 B2
(45) Date of Patent: *Oct. 17, 2006

(54) METHOD AND APPARATUS FOR DISTRIBUTING MELT IN A MULTI-LEVEL STACK MOLD

(75) Inventors: George Olaru, Toronto (CA); Denis Babin, Georgetown (CA); Paul Matysek, Toronto (CA); Neil Dewar, Georgetown (CA)

(73) Assignee: Mold-Masters Limited, Georgetown (CA)

(*) Notice: Subject to any disclaimer, the term of this patent is extended or adjusted under 35 U.S.C. 154(b) by 19 days.

This patent is subject to a terminal disclaimer.

(21) Appl. No.: 10/892,397

(22) Filed: Jul. 16, 2004
(Under 37 CFR 1.47)

(65) Prior Publication Data

US 2005/0058743 A1    Mar. 17, 2005

Related U.S. Application Data

(60) Continuation of application No. 10/420,921, filed on Apr. 23, 2003, now Pat. No. 6,852,265, which is a division of application No. 09/568,130, filed on May 10, 2000, now Pat. No. 6,575,731.

(30) Foreign Application Priority Data

May 10, 1999  (CA) .................................. 2271407

(51) Int. Cl.
    *B29C 45/23*    (2006.01)
(52) U.S. Cl. .................. 264/328.8; 425/564; 425/572
(58) Field of Classification Search ............... 425/564, 425/563, 565, 572, 581, 588; 264/328.8
    See application file for complete search history.

(56) References Cited

U.S. PATENT DOCUMENTS

| 4,212,626 A | 7/1980 | Gellert |
| 4,244,909 A | 1/1981 | Gellert |
| 4,539,171 A | 9/1985 | Sorensen |
| 4,586,887 A | 5/1986 | Gellert |
| 4,884,962 A | 12/1989 | Sheffield |
| 4,891,001 A | 1/1990 | Gellert |
| 4,971,747 A | 11/1990 | Sorensen |
| 5,011,646 A | 4/1991 | Bertschi |
| 5,229,145 A | 7/1993 | Brown et al. |
| 5,370,523 A | 12/1994 | Kushnir |
| 5,382,158 A | 1/1995 | Herbst |
| 5,460,510 A | 10/1995 | Gellert |

(Continued)

FOREIGN PATENT DOCUMENTS

| EP | 0 911 139 A2 | 9/1998 |
| JP | 58051125 | 3/1983 |

OTHER PUBLICATIONS

G. Bagusche—"HinterspritzenUnd Balancieren Eines Etaggen-Werkzeugs," *Kunststoffe 2376*: 176, Carl Hauser Verlag (Feb. 1, 1995).

(Continued)

*Primary Examiner*—Tim Heitbrink
(74) *Attorney, Agent, or Firm*—Mebler Ferro PLLC

(57) ABSTRACT

An improved melt distribution system and method is provided for a multi-level stack mold having three or more moving platens. The injection machine communicates with a bifurcated sprue bar for providing pressurized melt through the first moving platen to a central distribution manifold in the second moving platen. From the central distribution manifold, the flow of pressurized melt is distributed to the first and third platens for transfer to a plurality of mold cavities.

19 Claims, 12 Drawing Sheets

U.S. PATENT DOCUMENTS

| | | | |
|---|---|---|---|
| 5,484,275 A | 1/1996 | Kushnir | |
| 5,846,472 A | 12/1998 | Rozema et al. | |
| 6,190,585 B1 * | 2/2001 | Brown et al. | 264/328.8 |
| 6,348,171 B1 | 2/2002 | Dewar et al. | |
| 6,409,955 B1 | 6/2002 | Schmitt et al. | |
| 6,575,731 B1 | 6/2003 | Olaru et al. | |
| 6,852,265 B1 * | 2/2005 | Olaru et al. | 264/328.8 |

OTHER PUBLICATIONS

K. Gauler—"Hot Runner Technology For Multi-Platent Injection Molds" *Kunststoffe 2376*: 173-175, Carl Hanser Verlag (Feb. 1, 1995).

Product description of Yudo "Stackmold" from http://www.yudo.co.kr/html/2-tec/sub1.asp, dated May 22, 2003.

* cited by examiner

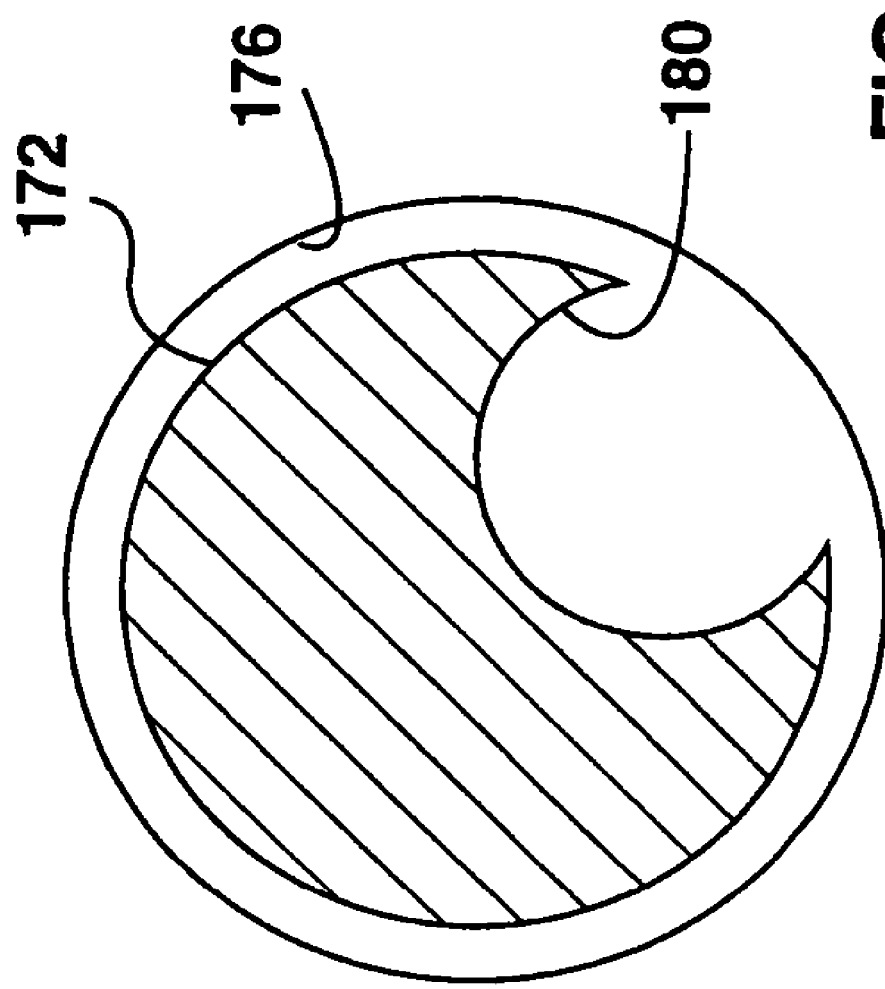

METHOD AND APPARATUS FOR DISTRIBUTING MELT IN A MULTI-LEVEL STACK MOLD

This application is a continuation of application Ser. No. 10/420,921 filed Apr. 23, 2003 now U.S. Pat. No. 6,852,265, which is a divisional of application Ser. No. 09/568,130 filed May 10, 2000. application Ser. No. 09/568,130 issued on Jun. 10, 2003 as U.S. Pat. No. 6,575,731, and claims priority from Canadian Application No. 2,271,407, filed May 10, 1999.

FIELD OF THE INVENTION

This invention relates to injection molding and, in particular, to the distribution of melt through a multi-level stack mold.

BACKGROUND OF THE INVENTION

Stack molding advantageously permits molding machine output to be multiplied without appreciably increasing the overall size of the machine. However, stack molding has the disadvantage that a more extensive melt runner system is required to extend through the moving platens to reach the cavities.

It is well known that the configuration of a melt distribution path through an injection stack mold critically affects the overall part quality. Failure to provide a melt flow under equal pressure to each mold cavity will result in differential filling of the cavities and will not produce consistent parts from cavity to cavity. Typically, even pressures from cavity to cavity are ensured by providing equal length runner passages with an identical number of bends of identical radius and arc. This is usually achieved by locating the main distribution manifold centrally within the stack mold, usually within one of the moving platens.

To transfer pressurized melt to the moving platen (i.e. across the first parting line between the stationary platen and the moving platen), typical applications have provided a sprue bar extending through the stationary platen from the machine nozzle across to the moving platen, as shown in U.S. Pat. No. 5,011,646 to Berteschi. This structure has the disadvantages that the sprue bar is in the way when the mold is open and damages falling parts. Furthermore, the sprue bar interferes with any robotic arm which may be provided to assist with part ejection, mold face preparation or the like.

The extensive runner system makes the use of a sprue bar system even more unsatisfactory in multi-level stack molds. For example, U.S. Pat. No. 5,370,523 to Kushnir and European Patent Application No. EP-911139 disclose a centrally located sprue bar arrangement for feeding pressurized melt to the various moving platens of a multi-level stack mold. The presence of the central sprue bar, however, limits the ability of mold larger parts, due to the interference of the sprue bar location and the mold cavity placement.

U.S. Pat. No. 5,846,472 to Rozema et al. teaches a more complex eccentric sprue bar arrangement for use in three- and four-level stack molds. The numerous sprue bars, however, only compound the problems noted above. Furthermore, the presence of multiple sprue bars can limit the size of parts that can be molded.

Another problem associated with multi-level stack molds is that the maximum height of parts to be molded is limited by the distance that the molding machine can move between its open and closed positions and the amount of space required for each mold level. For example, the telescoping configuration of the sprue bars of EP-911139 must be made more extensive if wider platen separation is desired. Rozema et al. teach providing a bifurcated sprue bar to permit greater separation of platens upon mold parting, however, the limitations of Rozema et al. have been noted above.

Accordingly, there is a need for a melt distribution arrangement for multi-level stack molds which has generally equal length melt paths for each mold level. Furthermore, there is a need for a melt distribution arrangement for a multi-level stack mold which does not require a centrally-located sprue bar, thereby allowing single parts to be molded which extend across the central mold axis. There is yet a further need for a melt distribution arrangement for a multi-level stack mold which utilizes a minimal number of sprue bars to minimize interference with the molding process. There is also a need for an improved drool control apparatus for use in multi-level stack molds.

SUMMARY OF THE INVENTION

In one aspect the present invention provides a multi-level stack mold comprising a stationary platen, a first, second and third moving platens, the moving platens being moveable between an "open" and "closed" position in a longitudinal direction generally parallel to a generally centrally disposed mold axis, a plurality of mold cavities defined between the stationary and moving platens, a first mold cavity manifold disposed in the first moving platen in communication with at least one of said mold cavities, a second mold cavity manifold disposed in the third moving platen in communication with at least one of said mold cavities and a sprue bar assembly extending through the first platen for selectively providing a flow of pressurized melt from the stationary platen to the second platen for distribution to the first and second mold cavity manifolds.

In a second aspect, the present invention provides a multi-level stack mold comprising a stationary platen, a first, second and third moving platens, the moving platens being moveable between an "open" and "closed" position in a longitudinal direction generally parallel to a generally centrally disposed mold axis, a plurality of mold cavities defined between the stationary and moving platens, a first mold cavity manifold disposed in the first moving platen in communication with at least one of said mold cavities, a second mold cavity manifold disposed in the third moving platen in communication with at least one of said mold cavities, a bifurcated sprue bar assembly extending through the first platen for selectively providing a flow of pressurized melt from the stationary platen to the second platen, the sprue bar assembly having a first portion and a second portion in flow communication, the second portion separably matable with the first portion, the sprue bar assembly being disposed eccentrically from the central mold axis and a distribution manifold disposed in the second platen in flow communication with the sprue bar assembly for selectively providing the flow of pressurized melt to the first and second mold cavity manifolds, whereby when the mold is in its closed position, the first and second portions of the sprue bar assembly are in communication with each other and the distribution manifold is in communication with the first and second mold cavity manifolds.

In a third aspect, the present invention provides a multi-level stack mold, the stack mold comprising a stationary platen, a first, second and third moving platens, the moving platens being moveable between an "open" and "closed" position in a longitudinal direction generally parallel to a generally centrally disposed mold axis, a plurality of mold cavities defined between the stationary and moving platens, a first mold cavity manifold disposed in the first moving platen in communication with at least one of said mold cavities, a second mold cavity manifold disposed in the third moving platen in communication with at least one of said mold cavities, a distribution manifold in one of said moving platens and a bifurcated sprue bar assembly connected to, and in communication with, the distribution manifold for providing a flow of pressurized melt to the distribution manifold, the sprue bar assembly being disposed eccentrically from the central mold axis, whereby the sprue bar assembly and the distribution manifold are arranged to be non-coaxial.

In a fourth aspect, the present invention provides a method of distributing pressurized to a melt in a multi-level stack mold having a stationary platen, a first, second and third moving platens, the moving platens being moveable between an "open" and "closed" position in a longitudinal direction generally parallel to a generally centrally disposed mold axis, a plurality of mold cavities defined between the stationary and moving platens, a first mold cavity manifold disposed in the first moving platen in communication with at least one of said mold cavities, and a second mold cavity manifold disposed in the third moving platen in communication with at least one of said mold cavities, the method comprising the steps of transferring the pressurized melt from the stationary platen to a distribution manifold in the second moving platen and distributing the pressurized melt to the first and third moving platens via the first and second mold cavity manifolds for delivery to a plurality of mold cavities.

BRIEF DESCRIPTION OF THE DRAWINGS

For a better understanding of the present invention, and to show more clearly how it may be carried into effect, reference will now be made by way of example to the accompanying drawings.

The drawings show the preferred embodiments of the present invention, in which:

FIG. 12 is a sectional view of the drool control apparatus of FIG. 8, taken along the line 12—12.

DETAILED DESCRIPTION OF THE PREFERRED EMBODIMENT

Figure 1:
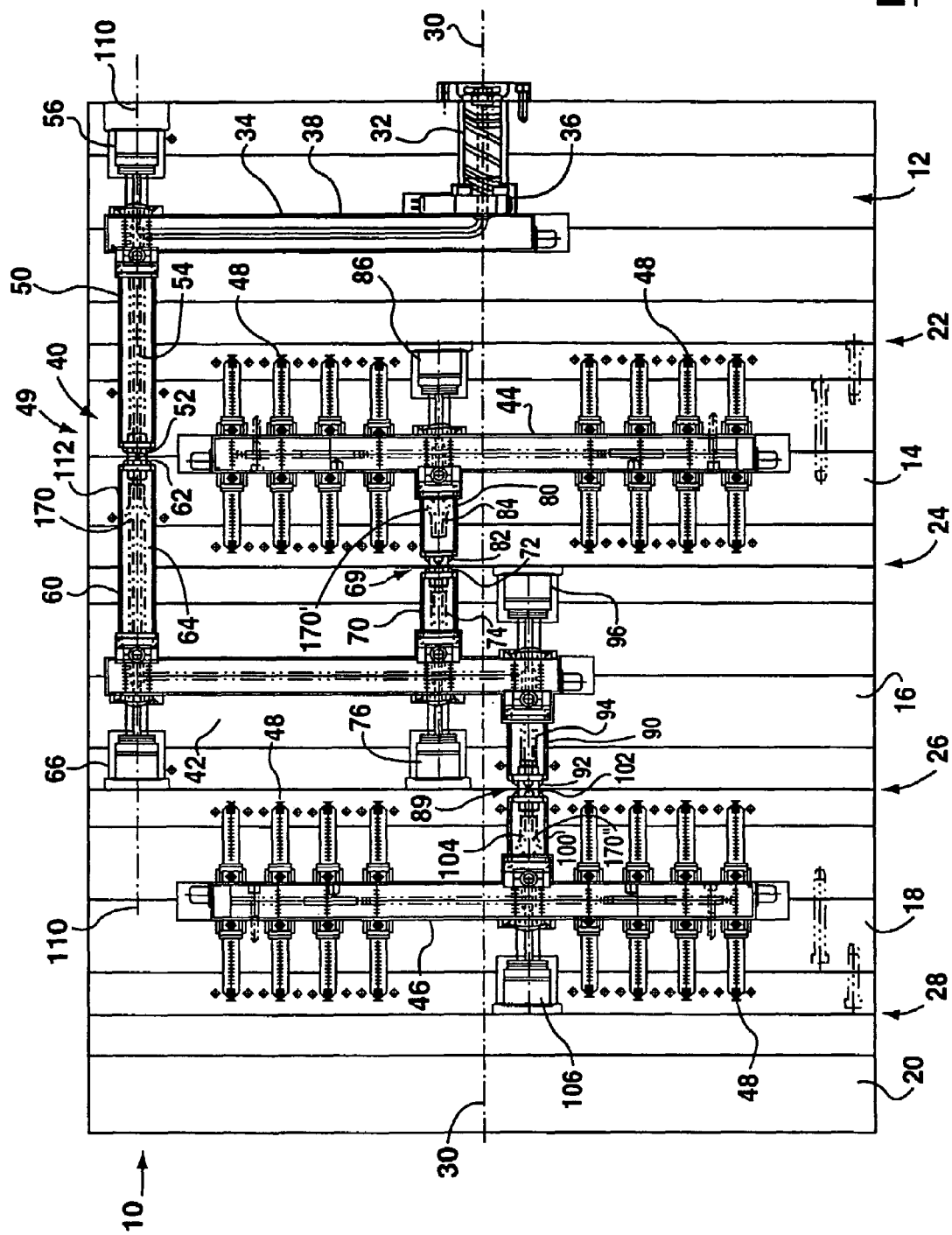
FIG. 1 is a sectional view of a four-level stack mold apparatus according to a first embodiment of the invention, shown in the closed position.

Referring now to FIG. 1, a stack mold embodying an improved melt distribution system in accordance with the present invention is shown generally at 10.

Stack mold 10 comprises a stationary platen or back plate 12, a first moving platen 14, a second moving platen 16, a third moving platen 18 and a fourth moving platen 20. Platens 12, 14, 16, 18 and 20 are selectively matable at a first parting line 22, and a second parting line 24, a third parting line 26 and a fourth parting line 28, respectively. Stack mold 10 has a mold injection axis 30 defining longitudinal opening and closing directions for the moving platens.

An injection molding machine (not shown) has an injection nozzle 32 which communicates with a heated runner system 34 via a sprue bushing 36. Heated runner system 34 comprises a back plate runner passage 38, a sprue bar assembly 40, a central distribution manifold 42, a first platen manifold 44 and a third platen manifold 46. First platen manifold 44 and third platen manifold 46 communicate with a plurality of mold cavities (not shown), defined between the platens at the parting lines, via a plurality of mold cavity gates 48.

Sprue bar assembly 40 comprises a first portion 40' and a second portion 40" selectively joined by a first melt flow control valve assembly 49. Inside sprue bar assembly 40, a first runner passage 50 communicates with a second runner passage 60, via control valve 49. First flow control valve assembly 49 comprises a first runner gate 52, selectively closeable by a first valve pin 54 actuated by a first actuator 56, and a second runner gate 62, selectively closeable by a second valve pin 64 actuated by a second actuator 66. First flow control valve assembly 49 is preferably of the construction more particularly described in U.S. Pat. No. 4,212, 626 to Gellert, and further described below.

Central distribution manifold 42 communicates with first platen manifold 44 via a second flow control valve assembly 69. Second flow control valve assembly 69 is preferably constructed identically to first flow control valve assembly 49, and comprises a third runner passage 70, having a third runner gate 72, a third valve pin 74 and a third actuator 76, communicating with a fourth runner passage 80, having a fourth runner gate 82, a fourth valve pin 84 and a fourth actuator 86.

Central distribution manifold 42 also communicates with third platen manifold via a third flow control valve assembly 89. Third flow control valve assembly 89 is preferably constructed identically to the first and second flow control valve assemblies, and comprises a fifth runner passage 90, having a fifth runner gate 92, a fifth valve pin 94 and a fifth actuator 96, communicating with a sixth runner passage 100, having a sixth runner gate 102, a sixth valve pin 104 and a sixth actuator 106.

Sprue bar assembly 40 is disposed substantially parallel to injection axis 30, along a sprue bar axis 110. Sprue bar assembly 40 passes through first moving platen 14 via a first platen through-pass 112 (see FIG. 5). First platen through-pass 112 permits sprue bar assembly 40 to deliver pressurized melt directly to central distribution manifold 42 disposed in second platen 16. Central distribution manifold 42 communicates at an angle (preferably 90°, although almost any angle less than 180° is possible) with sprue bar 40 to transfer pressurized melt to a central portion of second platen 16. Melt is transferred to first platen manifold 44 and third platen manifold 46 for delivery to the mold cavities, as described above. The angle between distribution manifold 42 and sprue bar assembly 40 is required to permit actuator 66 to avoid interference with the flow of pressurized melt in runner system 34. Likewise, angle connections are required between the various portions of runner system 34 at each actuator location, (i.e. actuators 56, 66, 76, 86, 96 and 106).

Figure 2:
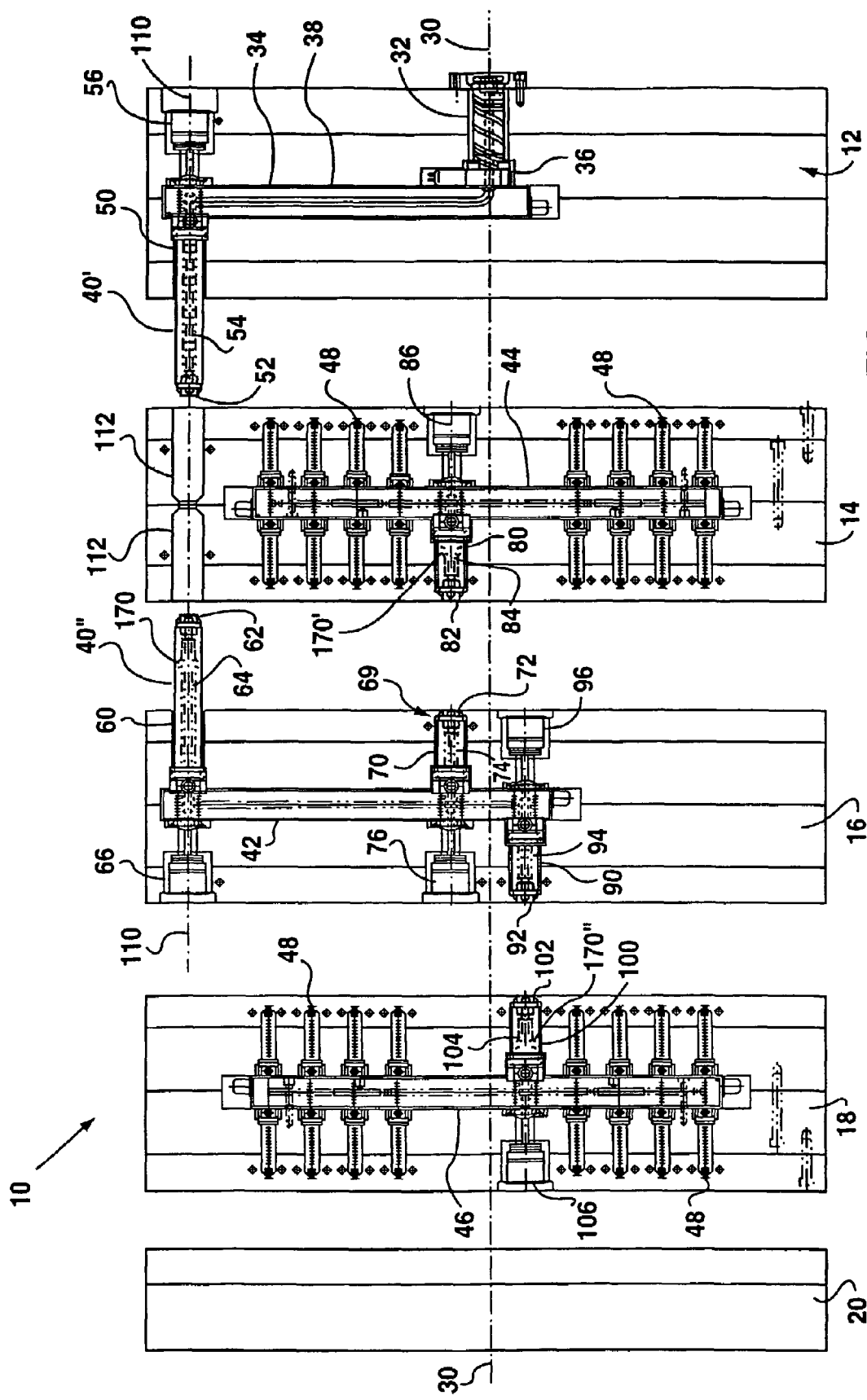
FIG. 2 is a sectional view of the apparatus of FIG. 1, shown in the open position.
Figure 5:
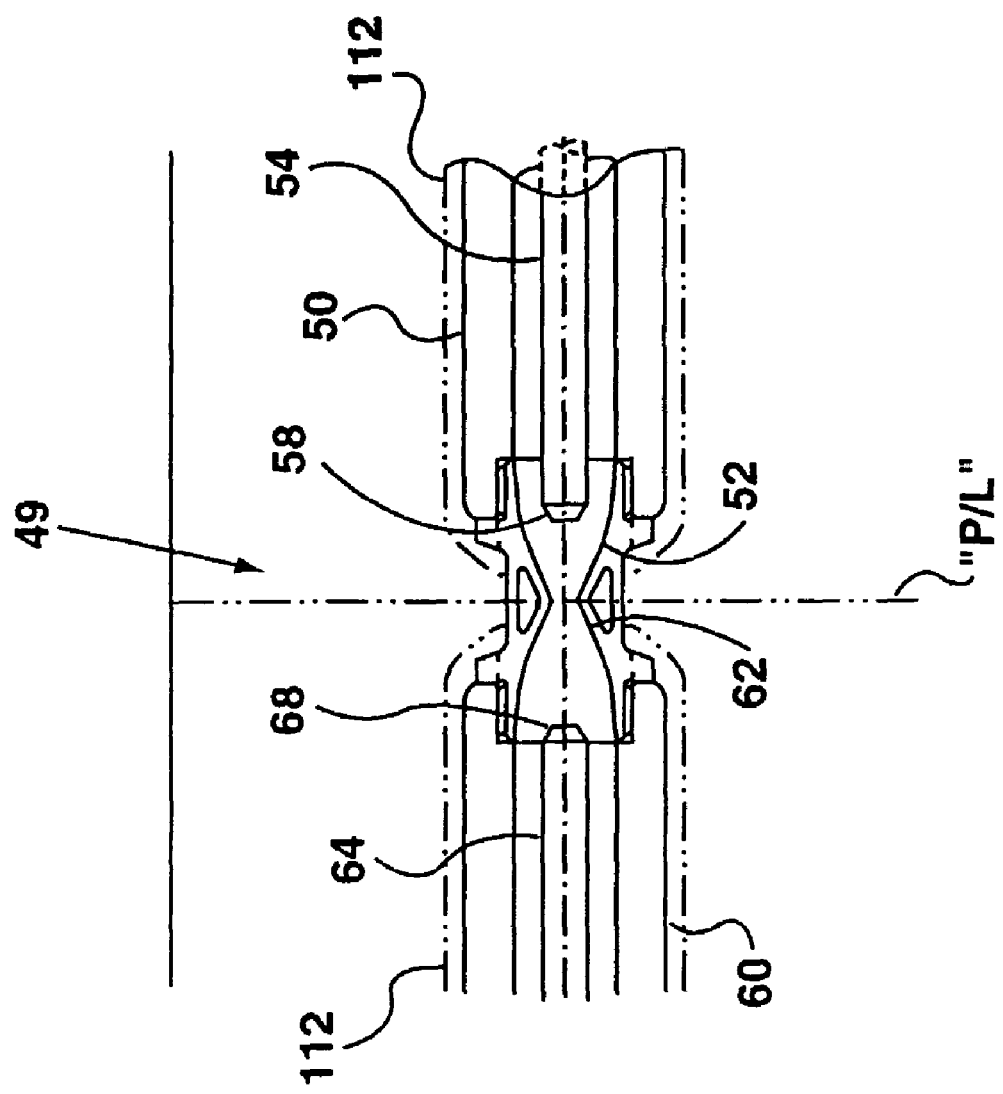
FIG. 5 is a sectional of view of a melt control valve for use in the present invention, shown in a open position.
Figure 6:
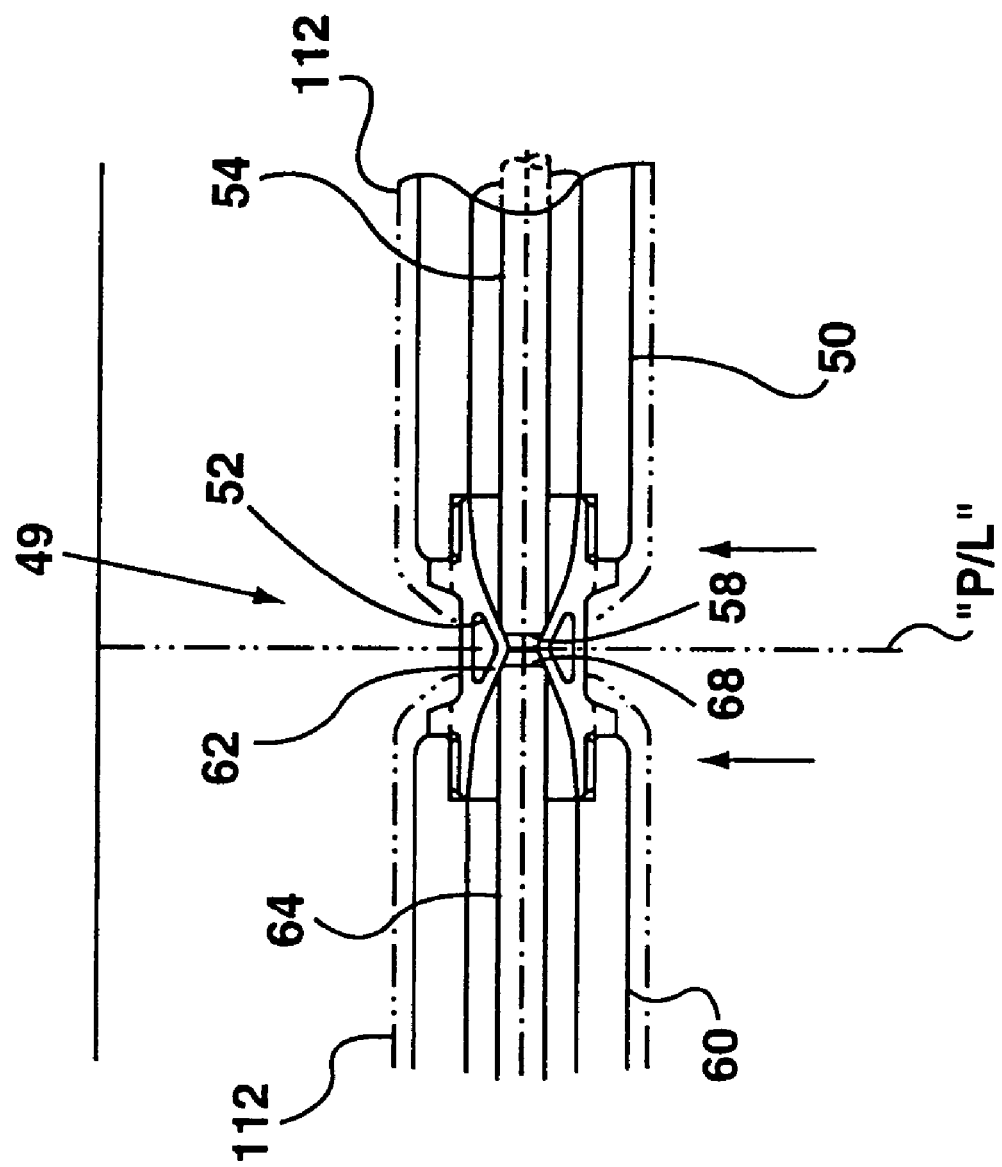
FIG. 6 is a sectional view of a melt control valve of FIG. 5, shown in a closed position.

As stated, the flow control valve assemblies are preferably designed in accordance with U.S. Pat. No. 4,212,626. Referring to FIGS. 5 and 6, first flow control valve assembly 49 preferably comprises first runner gate 52 sealable by a tip 58 of first valve pin 54. In its "open" position (FIG. 5), first valve pin 54 is withdrawn from gate 52, by first actuator 56 (see FIG. 1), to permit a flow of pressurized melt to exit first runner passage 50 via gate 52. Second valve pin 64 operates in a similar fashion, and cooperates with first valve pin 54 to allow the flow of pressurized melt to enter gate 62 when tip 68 is withdrawn therefrom. Referring to FIG. 6, prior to (or contemporaneously with) the parting of the mold, pins 54 and 64 are moved by their respective actuators such that tips 58 and 68 seal gates 52 and 62, respectively. With the runner gates sealed in this manner, the platens of the mold may then be parted (as shown in FIG. 2) without fear of melt drooling from gates 52 or 62.

Thus, first flow control valve assembly 49 has "open" (FIG. 5) and "closed" (FIG. 6) positions. As will be understood by one skilled in the art, the actuation of the valve pins is timed and synchronized such that the flow control valve assembly is "open" when the platens of the mold are closed, and the valve pins of the control valve assembly are moved to their "closed" position upon, or prior to, the opening of stack mold 10.

The reference marker "P/L" in the Figures represents the nominal parting line upon which the flow control valve assembly is parted. For first flow control valve assembly 49, it will be understood, with reference to FIGS. 1 and 2, that control valve assembly 49 does not part along one of the mold parting lines 22, 24, 26 or 28, but rather its own individual "parting line" within first platen 14.

Second flow control valve assembly 69 and third flow control valve assembly 89 are preferably constructed and operated in a manner similar to as first flow control assembly 49. Second and third flow control valve assemblies will have a parting line ("P/L") which coincides with parting lines 24 and 26, respectively.

The flow control valve assemblies may also optionally provide a cavity anti-drool means shown at 170, 170' and 170", as will be described in more detail below.

When stack mold 10 is closed, the flow control valve assemblies are in their respective "open" positions, as described above. The molding machine may then be actuated to force a flow of pressurized melt via nozzle 32 into back plate runner passage 38. The pressurized melt is transferred, via heated runner system 34, to the plurality of mold cavities in stack mold 10. After the injection phase and packing phase, as is known in the art, the valve pins of the flow control valve units are actuated by their respective actuators to close the flow control valve units. Stack mold 10 may then be opened, as shown in FIG. 2, to eject the molded parts from stack mold 10. Upon opening of mold 10, the bifurcated sprue bar assembly 40 separates into its first and section portions 40' and 40", which are withdrawn from first platen through-pass 112 as the mold opens. Once the mold is open, the molded parts may be ejected from their respective cavities. The mold may then be closed, and the flow control valve assemblies opened in preparation for the next molding cycle.

First platen through-pass 112 advantageously permits sprue bar assembly 40 to directly communicate with central distribution manifold 42 in second platen 16. This configuration permits the more central distribution of pressurized melt to the first and third platen manifold, thereby facilitating a more balanced runner length design throughout the runner system. It will be understood, however, that through-pass 112 strictly need not be provided, but rather sprue bar 40 may pass around first platen 14 instead.

Figure 3:
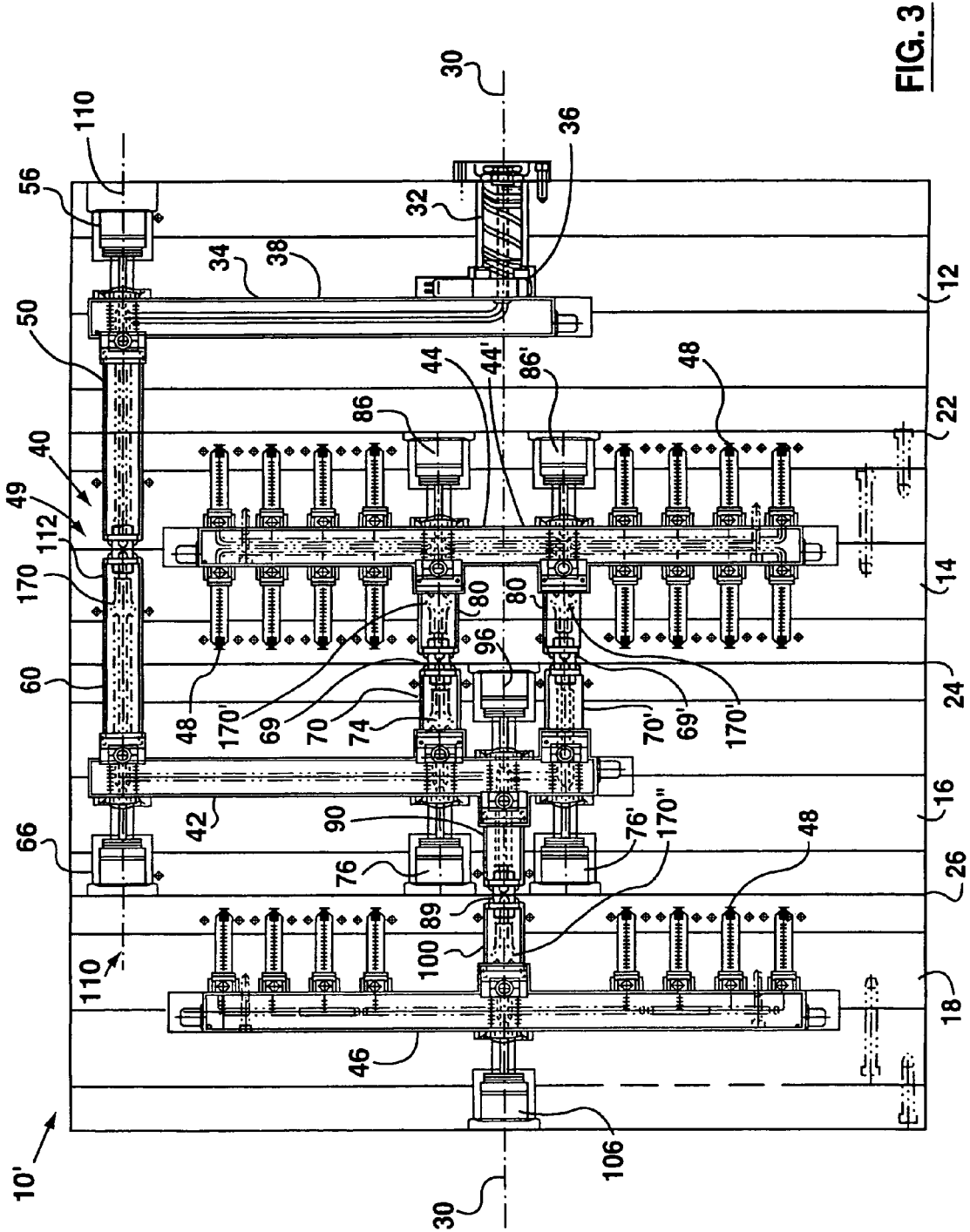
FIG. 3 is a sectional view of a three-level stack mold apparatus according to a second embodiment of the invention, shown in the closed position.
Figure 4:
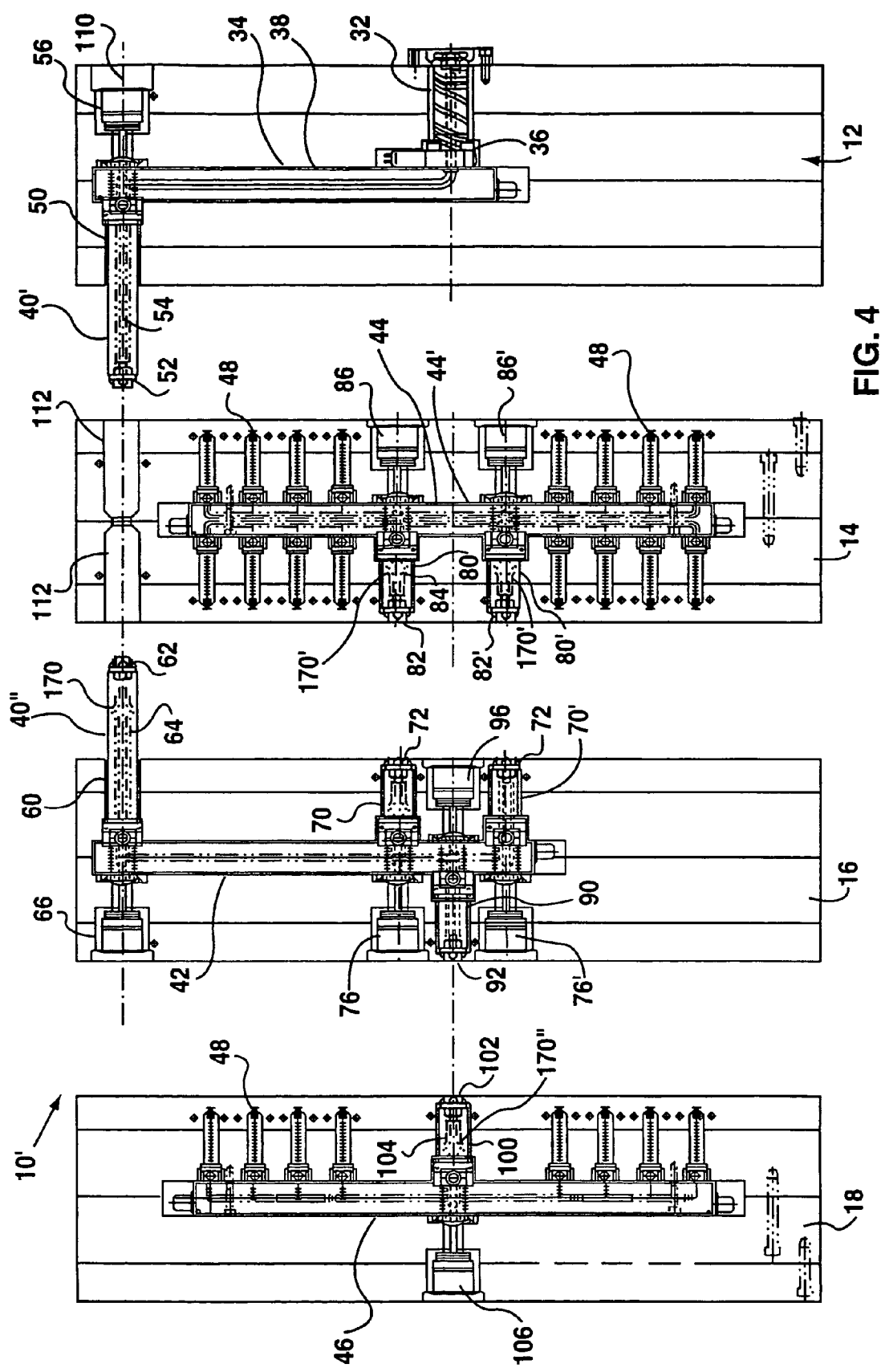
FIG. 4 is a sectional view of the apparatus of FIG. 3, shown in the open position.

Referring to FIGS. 3 and 4, the bifurcated sprue bar assembly design according to the present invention may be equally applied to other multi-level stack mold configurations, such as a three-level stack mold 10'. Three-level stack mold 10' has platens 12, 14 16 and 18, in a similar configuration as described above. Distribution manifold 42 communicates with first and third manifolds 44 and 46, respectively, as described above, although manifold 44 now has halves 44 and 44', to match the modified configuration of the 3-level mold, as will be understood by one skilled in the art.

Referring to FIGS. 7–12, a cavity anti-drool mechanism for use with the melt distribution system of the present invention will now be described. Note that, as will be apparent to one skilled in the art, FIGS. 7–11 are not shown on the same scale as FIGS. 1–4. In particular, the length of second runner passage 60, between, by-pass 174 and distribution manifold 42 has been shortened for convenience of illustration.

FIGS. 7–11 show the cavity anti-drool system combined with a flow control valve system of the type described above with reference to FIGS. 5 and 6. It will be apparent to one skilled in the art that the anti-drool mechanism described herein need not be limited to such combination, but may also be used alone, or in conjunction with another flow control valve configuration.

Figure 7:
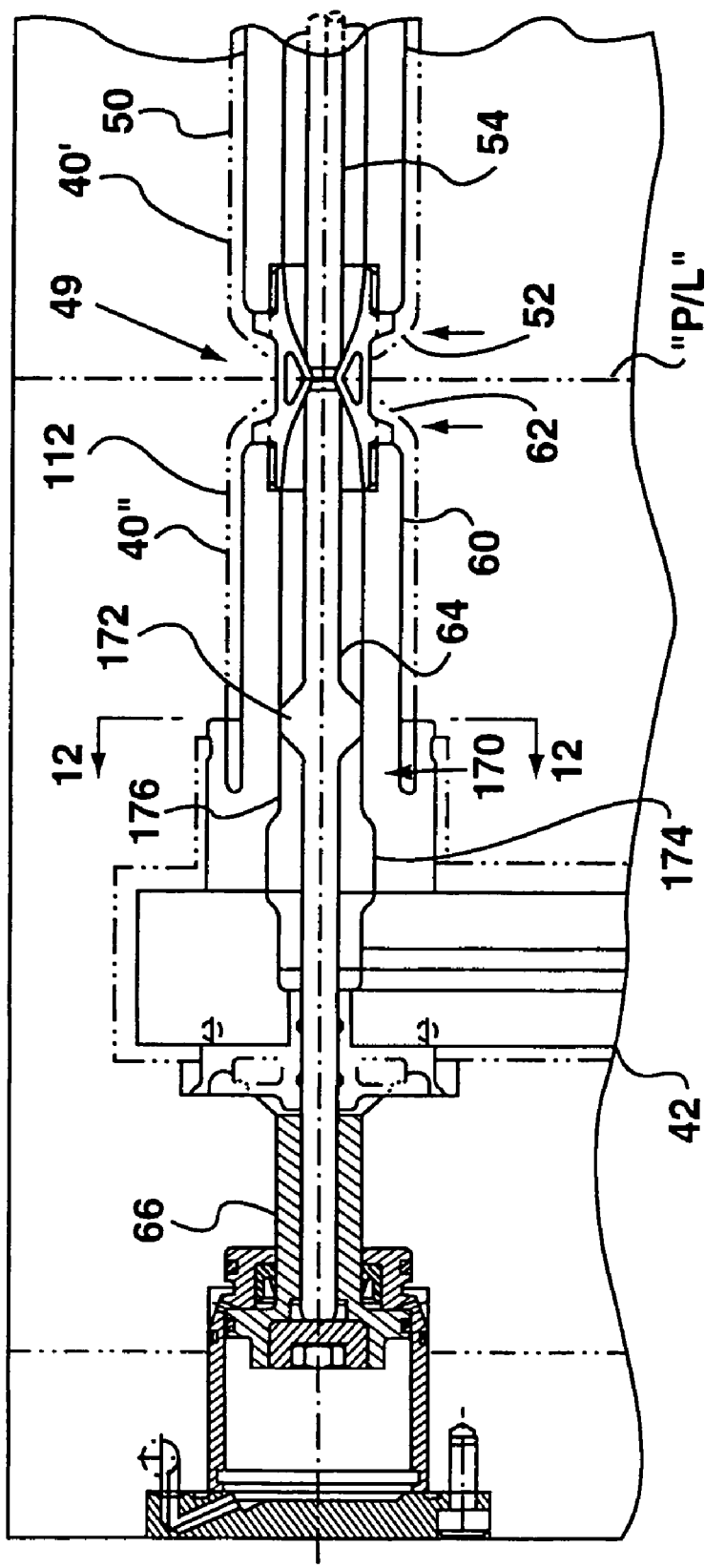
FIG. 7 is a not-to-scale sectional view of a drool control apparatus for use in the present invention, shown in a first position.

Referring to FIG. 7, positioned within first platen 14 is drool control assembly 170 which comprises a piston 172 and a by-pass chamber 174, being an enlarged section of second runner passage 60. Piston 172 is integrally incorporated in the second valve pin 64 and positioned on the stem of valve 64 such that piston 172 is positionable, in a first position, in a restricted section 176 of second runner passage 60 and, in a second position, in by-pass chamber 174.

For reasons which will become apparent below, piston 172, restricted section 176 and by-pass chamber 174 are shaped and sized to substantially block second runner passage 60 in its first position but permit melt flow therearound when piston 172 is in its second position in by-pass chamber 174, as described below.

Figure 8:
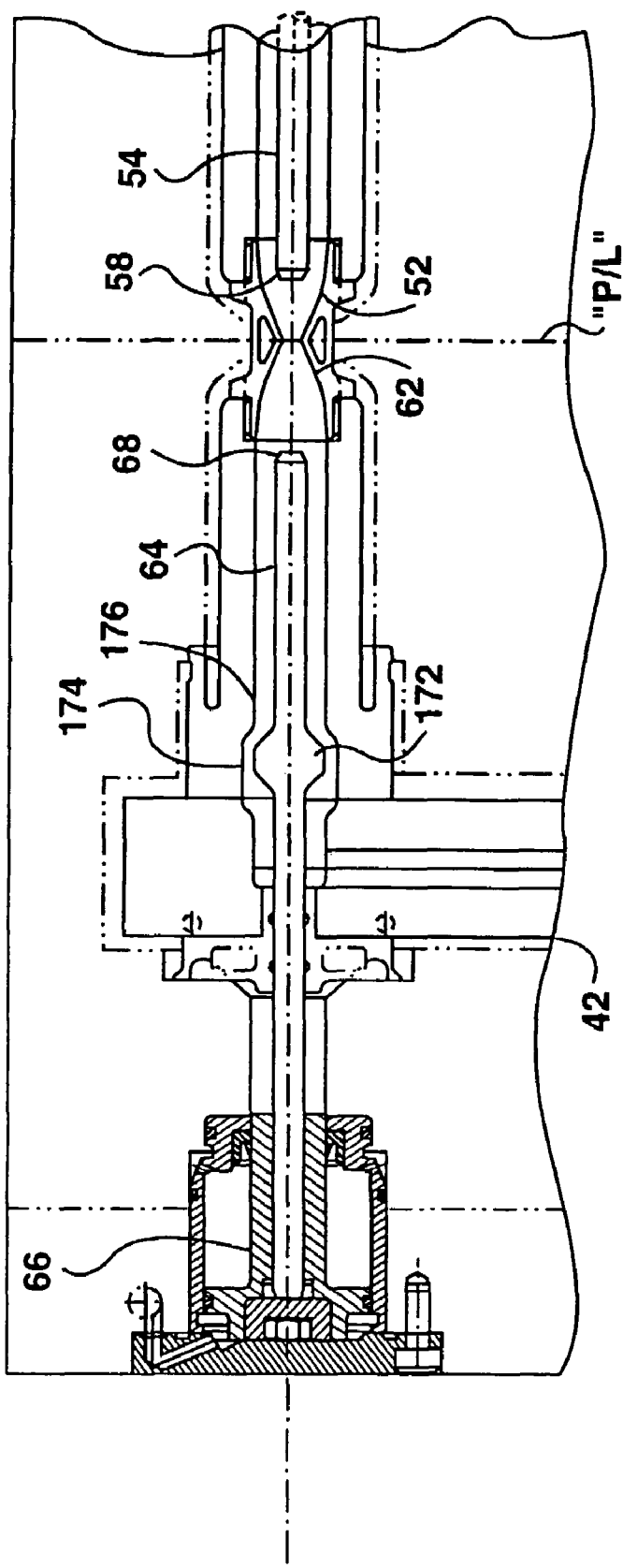
FIG. 8 is a not-to-scale sectional view of the drool control apparatus of FIG. 7, shown in a second position.

The operation of drool control assembly 170 is synchronized with mold injection as will now be described. Referring to FIG. 8, in preparation of the molding phase, actuator 66 moves second valve pin 64 to its "open" position, as shown in FIG. 8. In this position, piston 172 is positioned in by-pass chamber 174. At the same time, tip 68 of second valve pin 64 is withdrawn from second gate 62 and tip 58 of first valve pin 54 withdrawn from first gate 52 to permit flow through flow control valve assembly 49, although as discussed above, these flow control valve assembly components do not necessarily form part of the anti-drool control apparatus.

When positioned as shown in FIG. 8, melt is permitted to flow from the molding machine through first runner passage 50 and into second runner passage 60, around piston 172 through by-pass chamber 174 and into distribution manifold 42, for delivery to the mold cavities. Once the mold cavities are filled, the molding pressure is maintained to apply a packing pressure, as is known in the art.

Figure 9:
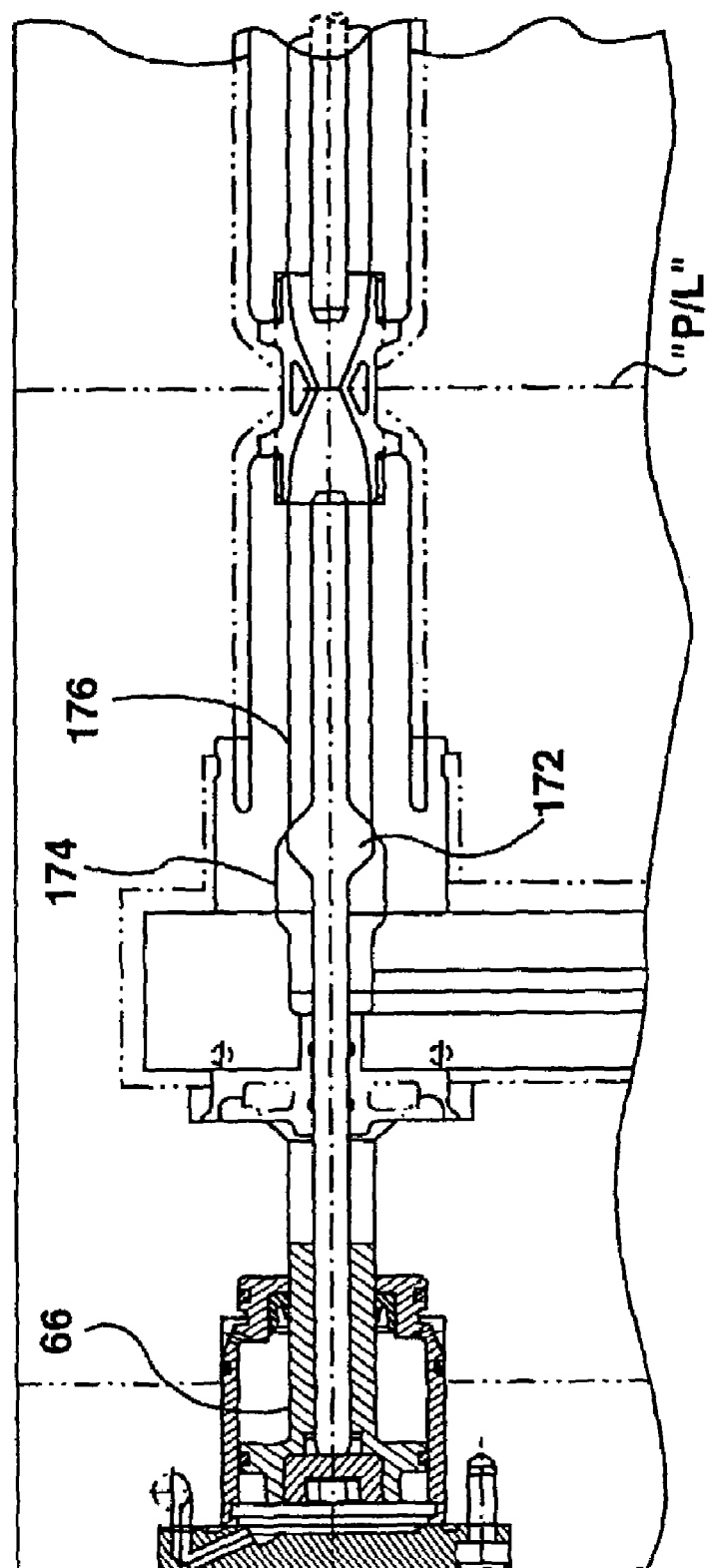
FIG. 9 is a not-to-scale sectional view of the drool control apparatus of FIG. 7, shown in the third position.

Referring to FIG. 9, upon completion of the packing phase, actuator 66 moves second valve pin 64 and piston 172

"upstream" (i.e., away, fluidly speaking, from the mold cavities), thereby causing piston 172 to enter restricted section 176. Upon the movement of piston 172 into restricted section 176, the melt material in second melt passage 60 on the upstream side of piston 172 is forced back into restricted section 176, along second melt passage 60 in the upstream direction.

Figure 10:
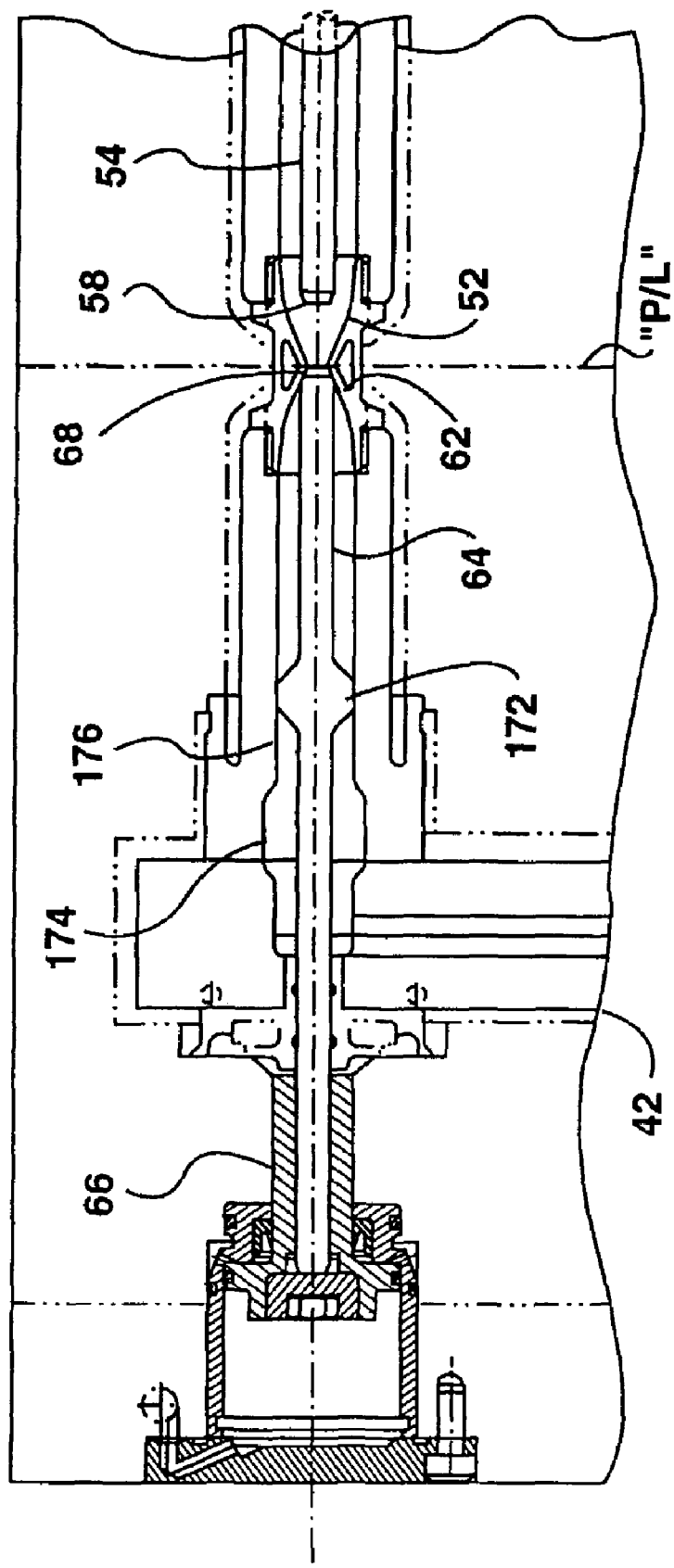
FIG. 10 is a not-to-scale sectional view of the drool control apparatus of FIG. 7, shown in a fourth position.

Referring to FIG. 10, as piston 172 travels upstream through restricted section 176, a pressure drop is created in the melt material immediately behind (i.e., "downstream" from) piston 172, which pressure drop is correspondingly transmitted to distribution manifold 42 and, ultimately, to gates 72 and 92. (Simultaneously, as second valve pin 64 moves to its full-stroke or "closed" position, the flow control valve assembly 49 partially closes by tip 68 of second valve pin 64 seating in gate 62 to close the downstream half of flow control valve assembly 49.) It will be understood that the stroke length of piston 172 is chosen to obtain the desired pressure drop in the runner system of first moving platen 14 to achieve the intended anti-drool performance.

Figure 11:
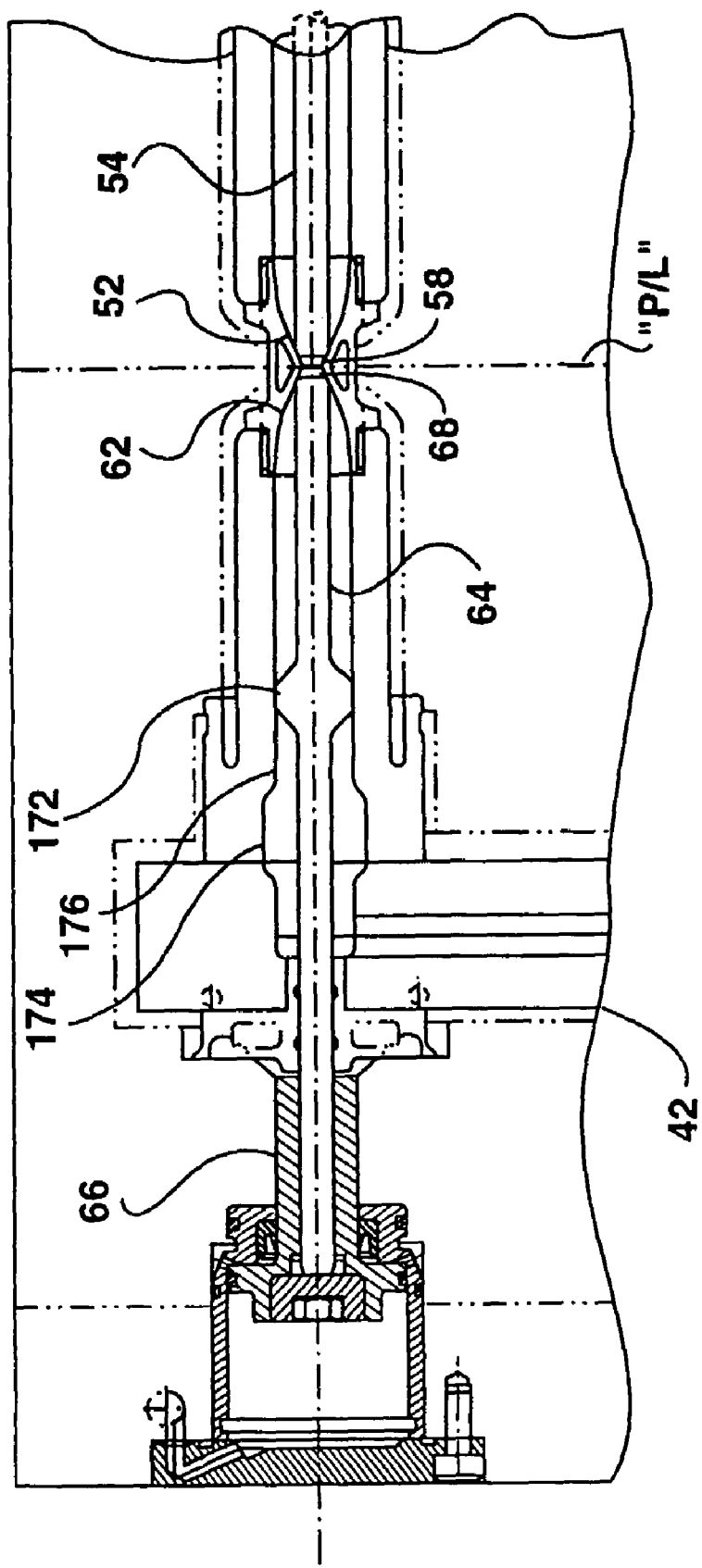
FIG. 11 is a not-to-scale sectional view of the drool control apparatus of FIG. 7, shown in a fifth position.

Referring to FIG. 11, once second valve pin 64 is in its "closed" position, the first valve pin 54 is closed, with tip 58 fully seated in gate 52. Flow control valve assembly 49 is now fully closed. Mold 10 may now be opened, along first parting line 22, (see FIG. 2 or 4) to permit the molded parts to be ejected from mold 10. By means of the pressure drop imparted by the drool control assembly 170, the decompressed melt in distribution manifold 42 advantageously reduces the tendency of the melt to drool from the gates 72 and 92.

Once the molded parts have been ejected from the mold, the mold may be closed and the molding machine readied for the next molding cycle.

Referring to FIG. 12, in the preferred embodiment, piston 172 has a substantially identical, but slightly smaller, cross-section to second melt passage 60, but also has a longitudinal cutout 180 through its thickness. Cutout 180 permits some melt to flow past piston 172 as it is stroked upstream during its decompression cycle, thereby reducing the resistance pressure the upstream melt exerts on piston 172. Thus, cutout 180 advantageously allows the size of piston 62 to be reduced. The size and shape of cutout 180 can be tuned to a particular molding application to optimize decompression performance in the stack mold manifold, as will be apparent to one skilled in the art.

The construction of anti-drool assembly 170, as described above, is preferably substantially the same as is used for anti-drool control assemblies 170' and 170". Anti-drool assemblies 170' and 170" may be used advantageously in fourth and sixth runner passages 80 and 100 to inhibit drool at gates 48 in thermally gated molding applications.

The term "piston" as described in reference to body 172 need not be a piston in the conventional sense, but may be any body capable of moving melt upstream in the runner system to effect a decompression downstream of the body.

Although it is desirable to actuate drool control assembly 170 prior to parting the mold, so that the melt material displaced upstream of piston 172 by the actuation of assembly 170 may return into first runner passage 22, it will also be understood that drool control assembly 170 may also be configured to actuate contemporaneously with the parting of the mold, provided that a suitable bleed arrangement, as will be understood by one skilled in the art, is made for the upstream melt displaced by the stroke of piston 172 in second runner passage 60.

While the above description constitutes the preferred embodiment, it will be appreciated that the present invention is susceptible to modification and change without parting from the fair meaning of the proper scope of the accompanying claims.

We claim:

1. A method of distributing pressurized melt in a multi-level stack mold comprising:
   providing pressurized melt from a machine nozzle;
   transferring the pressurized melt to a distribution manifold coupled to a second moving platen via a mechanically closeable sprue bar assembly;
   distributing the pressurized melt to a first manifold in a first moving platen;
   distributing the pressurized melt to an additional manifold in a third movable platen; and
   injecting the pressurized melt into a plurality of mold cavities from said first manifold and said additional manifold.

2. The method of distributing pressurized melt in a multi-level stack mold according to claim 1, wherein the pressurized melt is distributed from the distribution manifold to the first manifold through a mechanically closeable runner gate.

3. The method of distributing pressurized melt in a multi-level stack mold according to claim 1, wherein the pressurized melt is distributed from the distribution manifold to the additional manifold through a mechanically closeable runner gate.

4. The method of distributing pressurized melt in a multi-level stack mold according to claim 1, wherein the first manifold includes a first portion and a second portion and the pressurized melt is distributed from the distribution manifold to the first portion of the first manifold through a first mechanically closeable runner gate and pressurized melt is distributed from the distribution manifold to the second portion of the first manifold through a second mechanically closeable runner gate.

5. A method of distributing pressurized melt in a multi-level stack mold comprising the steps of:
   providing pressurized melt from a machine nozzle;
   transferring the pressurized melt to a distribution manifold coupled to a second moving platen via a sprue bar assembly;
   distributing the pressurized melt from the distribution manifold to a first manifold in a first moving platen;
   distributing the pressurized melt from the distribution manifold to an additional manifold in a third movable platen; and
   injecting the pressurized melt into a plurality of mold cavities from said first manifold and said additional manifold,
   wherein the pressurized melt is distributed from the distribution manifold to at least one of the first manifold and the additional manifold through a mechanically closeable runner gate.

6. The method of distributing pressurized melt in a multi-level stack mold according to claim 5, wherein the pressurized melt is distributed from the distribution manifold to both the first manifold and the additional manifold through a mechanically closeable runner gate.

7. A multi-level stack mold comprising:
   a mold having a stationary platen and at least a first, second and third moving platens defining a plurality of mold cavities therebetween, said first moving platen disposed between said stationary platen and said second moving platen, said mold moveable longitudinally between an open and a closed position;

a first manifold in said first moving platen, said first manifold in communication with at least one of said plurality of mold cavities;

an additional manifold in said third moving platen, said additional manifold in communication with at least one of said plurality of mold cavities; and a distribution manifold disposed in said second moving platen and configured to communicate with said first manifold and said additional manifold, a sprue bar assembly having a first sprue bar portion mounted to said stationary platen and a second sprue bar portion mounted to said second moving platen, said first sprue bar portion communicating with a molding machine nozzle and extending to a first mechanically closeable runner gate, said second sprue bar portion extending from a second closeable runner gate and communicating with said distribution manifold, said first runner gate configured to be in communication with said second runner gate.

8. The multi-level stack mold according to claim 6, wherein said first manifold includes a first portion that communicates directly with said distribution manifold and a second portion that communicates directly with said distribution manifold.

9. The multi-level stack mold according to claim 8, wherein said first portion of said first manifold communicates with said distribution manifold though a first control valve assembly and said second portion of said first manifold communicates with said distribution manifold through a second control valve assembly.

10. The multi-level stack mold according to claim 9, wherein said first and second control valve assemblies include respective valve pins.

11. The multi-level stack mold according to claim 6, further comprising:
a fourth movable platen, wherein said additional manifold is in communication with at least one cavity defined between said fourth movable platen and said third movable platen.

12. The multi-level stack mold according to claim 6, wherein said first mechanically closeable runner gate includes a valve pin.

13. The multi-level stack mold according to claim 6, wherein said second closeable runner gate includes a valve pin.

14. The multi-level stack mold according to claim 13, wherein said valve pin includes an enlarged piston portion and said valve pin is configured to move such that said enlarged piston portion moves into and out of an enlarged portion of a melt channel that extends through the second spine bar portion, wherein said melt channel is at least partially restricted when said enlarged piston portion is out of said enlarged portion of the melt channel.

15. A multi-level stack mold comprising:
a mold having a stationary platen and at least a first, second and third moving platens defining a plurality of mold cavities therebetween, said first moving platen disposed between said stationary platen and said second moving platen, said mold moveable longitudinally between an open and a closed position;

a first manifold in said first moving platen, said first manifold in communication with at least one of said plurality of mold cavities;

an additional manifold in said third moving platen, said additional manifold in communication with at least one of said plurality of mold cavities; and a distribution manifold disposed in said second moving platen and configured to communicate with said first manifold and said additional manifold, a sprue bar assembly communicating with a molding machine nozzle and with said distribution manifold.

16. The multi-level stack mold according to claim 15, wherein said first manifold includes a first portion that communicates directly with said distribution manifold and a second portion that communicates directly with said distribution manifold.

17. The multi-level stack mold according to claim 16, wherein said first portion of said first manifold communicates with said distribution manifold through a first control valve assembly and said second portion of said first manifold communicates with said distribution manifold through a second control valve assembly.

18. The multi-level stack mold according to claim 17, wherein said first and second control valve assemblies include respective valve pins.

19. The multi-level stack mold according to claim 15, further comprising:
a fourth movable platen, wherein said additional manifold is in communication with at least one cavity defined between said fourth movable platen and said third movable platen.

* * * * *

UNITED STATES PATENT AND TRADEMARK OFFICE
CERTIFICATE OF CORRECTION

PATENT NO. : 7,122,145 B2
APPLICATION NO. : 10/892397
DATED : October 17, 2006
INVENTOR(S) : George Olaru et al.

Page 1 of 1

It is certified that error appears in the above-identified patent and that said Letters Patent is hereby corrected as shown below:

Claim 8, line 1, delete "6" and insert --7-- therefor.

Claim 11, line 1, delete "6" and insert --7-- therefor.

Claim 12, line 1, delete "6" and insert --7-- therefor.

Claim 13, line 1, delete "6" and insert --7-- therefor.

Signed and Sealed this

Twenty-sixth Day of June, 2007

JON W. DUDAS
*Director of the United States Patent and Trademark Office*